United States Patent [19]

Fischer

[11] 4,447,048

[45] May 8, 1984

[54] SYMMETRICAL THREE DEGREE OF FREEDOM COMPLIANCE STRUCTURE

[75] Inventor: Friedrich L. Fischer, Yorktown Heights, N.Y.

[73] Assignee: International Business Machines Corporation, Armonk, N.Y.

[21] Appl. No.: 336,487

[22] Filed: Dec. 31, 1981

[51] Int. Cl.³ .............................................. F16F 1/36
[52] U.S. Cl. .................................. 267/141.1; 267/160
[58] Field of Search ................ 188/378, 379; 267/136, 267/153, 141, 141.1, 160; 403/405

[56] References Cited

U.S. PATENT DOCUMENTS 2,591,769  4/1952  Beechler ......................... 267/160 X
3,120,382  2/1964  Paulsen ......................... 267/141.1 X Primary Examiner—Duane A. Reger
Attorney, Agent, or Firm—Roy R. Schlemmer

[57] ABSTRACT

A symmetrical three-degree of freedom compliant structure specifically adapted for use in robotic manipulators interposed between a movable robotic arm and the gripper fingers. The structure is uniquely adapted to serve as both a force sensing device and as an expendable mechanical link or fuse which will break due to sudden extreme forces being applied to said fingers and which is easily replaceable. The structure which comprises three separate elements resolves forces into three orthogonal components; X, Y, and Z. There is no mechanical coupling between the individual elements making up the overall compliant structure. Further, due to a multiple flexible web construction of each element, when an orthogonal force is applied to any one of the elements, the two primary planar regions of the element remain parallel. Thus, no rotational component is introduced into the structure.

10 Claims, 6 Drawing Figures

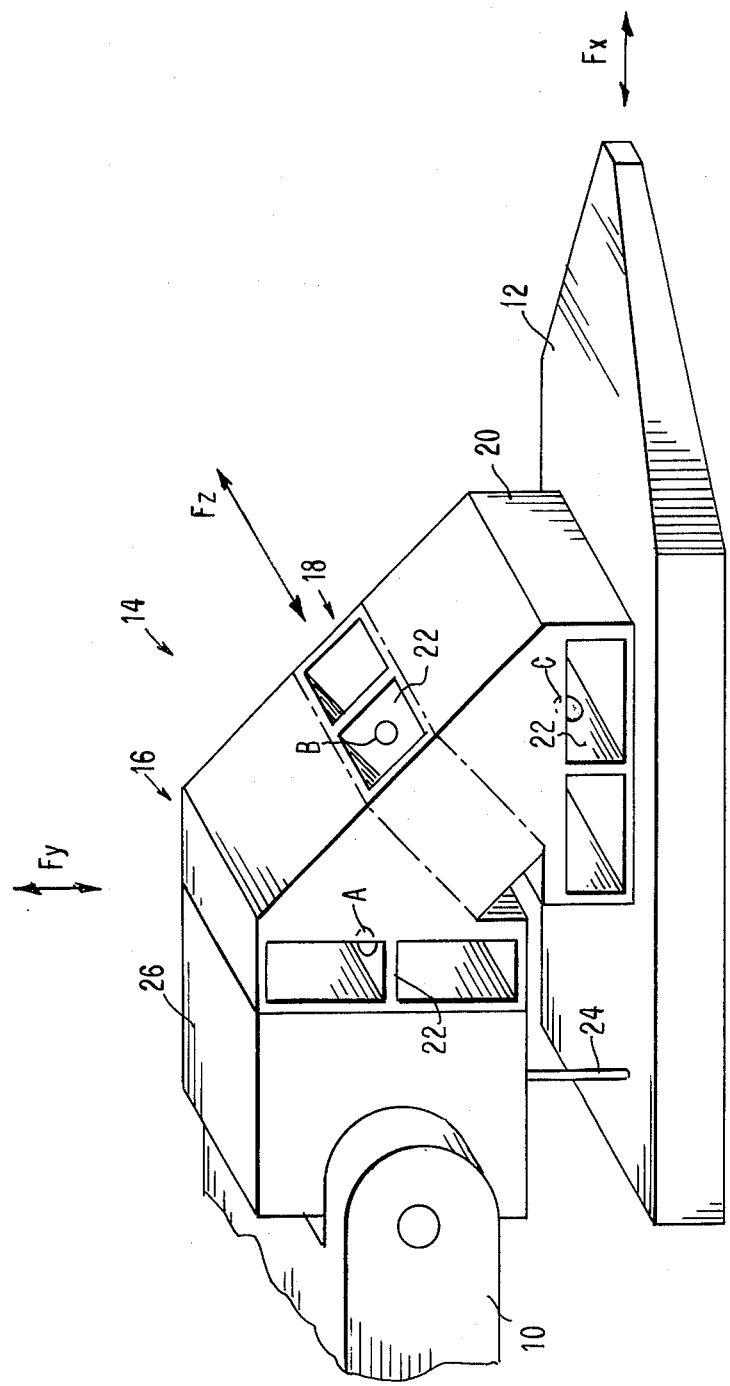
FIG. 1.1

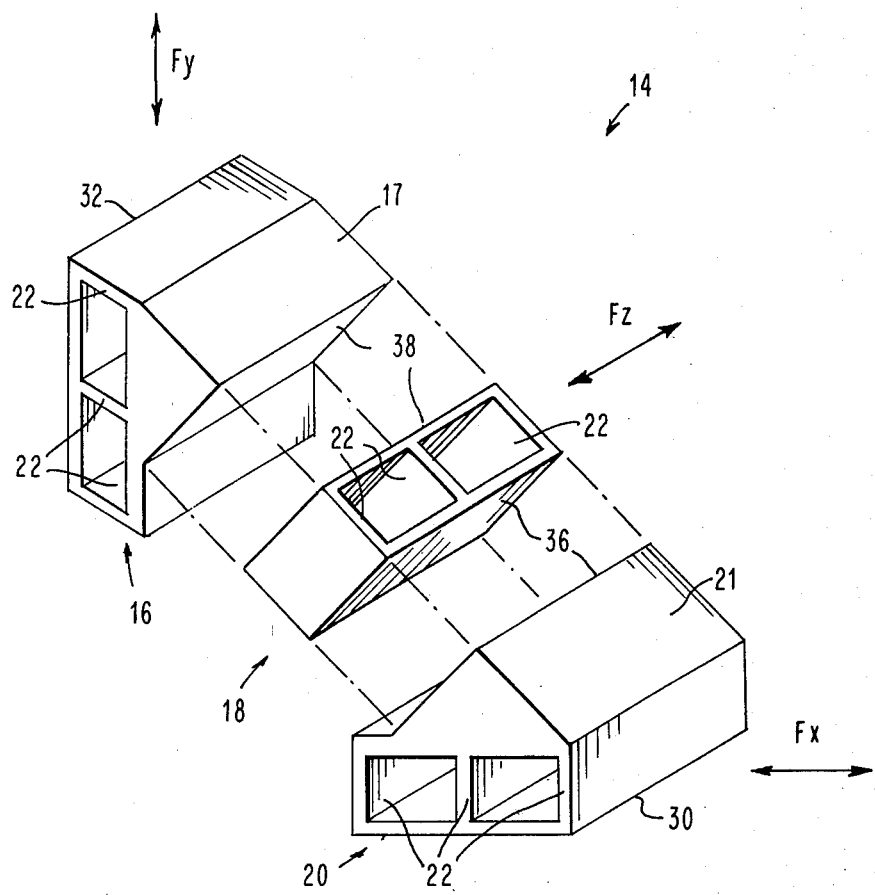
FIG. 1.2

SYMMETRICAL THREE DEGREE OF FREEDOM COMPLIANCE STRUCTURE

BACKGROUND OF THE INVENTION

The present invention relates primarily to the field of robotics; more particularly to a unique mechanical structure for mounting the gripper fingers on the end of a hydraulic manipulator arm. In such robotic manipulators, it is desirable to have a compliant member interposed between the manipulator arm and a gripper to reduce shocks to the extremely expensive hydraulic systems of the manipulator itself either to collision of the manipulator with other objects or when excessive forces are applied via the hydraulic system to an object being gripped. It is also desirable that such forces be resolved to the manipulator structure orthogonally, the mechanism may better be designed to resist such forces then when directly applied as diagonal, non-orthogonal forces.

It is usually necessary with most complex robotic manipulators, to accurately sense the forces applied to the gripper fingers whereby appropriate control signals may be fed back to the hydraulic control mechanisms which control the overall robotic system operation.

DESCRIPTION OF THE PRIOR ART

U.S. Pat. No. 4,132,318 assigned to the same assignee as the present invention, discloses an "Asymmetric Six-Degree-Of-Freedom Force-Transducer System for a Computer-Controlled Manipulator System" which utilizes a compliant structure comprising three separate i-beam modules to resolve and/or measure forces with X-Y-Z orthoganality.

U.S. Pat. No. 3,948,093 of Folchi, et al, entitled "A Six-Degree-of-Freedom Force Transducer for a Manipulator System" discloses a similar structure again utilizing a compliant structure made up of separate i-beam components to resolve X-Y-Z force orthogonality.

The structures disclosed in both of these patents, while capable of resolving or yielding orthogonally to the X, Y and Z forces are neither symmetrical nor compact. Further, there is a tendency for the primary mounting surface for each of the i-beam elements to rotate when a force is applied to the element normal to the plane of the i-beam web.

Another compliant structure for such manipulators is disclosed in an article entitled "Sensor Arrangement for a Manipulator Gripper" in the IBM Technical Disclosure Bulletin, Volume 24, #2, July 1981, pg. 1086, which utilizes, in essence, a two sided box-beam structure for the individual force resolving elements in place of the i-beam structures of the above referenced patents. The structure shown in this article is otherwise quite similar to those in said two previously referenced patents.

SUMMARY OF THE INVENTION

It is a primary object of the present invention to provide a compliant three-degree of freedom structure, uniquely adapted for mounting gripper fingers on a robotic manipulator.

It is a further object to provide such a structure which is mechanically symmetrical and which greatly simplifies installation.

It is yet another object to provide such a structure which resolves a force vector applied to said gripper finger into the three orthogonal force components, substantially free of any rotational moments.

It is a further object of the invention to provide such a structure which is extremely compact and inexpensive to manufacture, preferably by injection molding techniques.

The objects, features and advantages of the present invention are accomplished, in general, by a unitary compact structure comprising at least two and preferably three individual compliant elements, each of which is disposed within said structure to resolve an applied force into one of three orthogonal force vectors. Each of said elements comprises two spaced parallel rectangular planar regions joined at two of their opposite corresponding outer edges by thin flexible web sections which are parallel to each other and perpendicular to said planar regions. Preferably, at least one additional flexible web section is located intermediate to said other two web sections. Said elements are arranged in said structure so that two of said elements form the respective ends of said structure and are so oriented in the structure that both their planar regions and the individual flexible web elements of each structure are perpendicular to each other. The third element, in the preferred embodiment of said invention, is located within said composite structure intermediate of said other two elements and is oriented such that its planar region is disposed at an angle of approximately 45 degrees with respect to the planar regions of both of said other two elements and wherein the planes of the flexible webs of said third element are perpendicular to the planes of the flexible webs of said two other members.

It will be appreciated from the following description that the interior planar regions of said two end elements and both planar regions of said intermediate element merge into and become a unitary part of the overall assembly, especially when the entire assembly is formed as a unitary structure by an injection molding operation, or the like. The exterior planar regions of each two end elements are in fact, the mounting surfaces for the structure as will be apparent from the following discussion.

BRIEF DESCRIPTION OF THE DRAWINGS

FIG. 1.1 is a perspective view, showing the symmetrical three-degree of freedom compliance structure of the present invention interposed between the arm of a robotic manipulator and a gripper finger which would grasp a workpiece.

FIG. 1.2 comprises a detailed perspective view of the three-degree freedom compliance structure of FIG. 1, illustrating an alternative method of forming the overall structure.

DESCRIPTION OF THE PREFERRED EMBODIMENT

Figure 3:
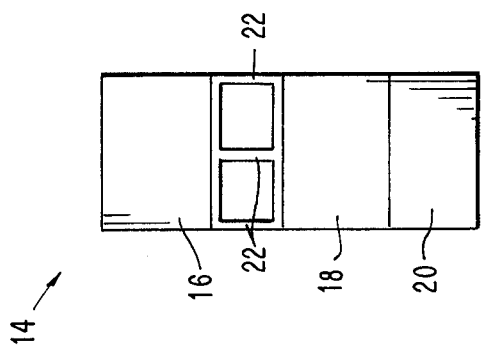
FIG. 3 comprises a plan view along line A—A of FIG. 2 of the compliance structure.

FIG. 1.1 shows a manipulator arm 10 and a gripper finger 12, with the three-degree of freedom compliance structure of the present invention 14, interposed there-between. The three orthogonal force vectors, $F_x$, $F_y$, and $F_z$ are also clearly shown in relationship to the three individual force resolving elements, 16, 18 and 20, making up the compliance structure. It should be clearly understood that while the force vectors $F_x$, $F_y$ and $F_z$ are shown adjacent to the elements 16, 18 and 20 for clarity, the device resolves force vectors applied to the gripper finger 12 and not applied to the elements per se.

In the embodiment of FIG. 1.1, each of the individual compliance elements includes three flexible webs 22. It is noted that the reference numeral 22 is utilized therein to designate the flexible webs in all three of the individual compliance elements, although, in each of the elements, only one of the webs is particularly designated with the reference numeral 22 for purposes of clarity.

When an external force such as $F_y$ is applied to gripper finger 12, the individual webs 22 in compliance element 16 would flex. As a result, the planar regions or portions of the individual elements to which the webs 22 are attached at their ends, will move slightly relative to each other. The same action will occur in element 18 when a force $F_z$ is applied to gripper finger 12 and an element 20 when a force $F_x$ is applied to finger 12. It will also be apparent that if a force vector $F_v$ is applied to the finger 12 which is a composite of all three orthogonal force directions X, Y and Z, each of the elements 16, 18 and 20 will individually resolve only that portion of the composite vector which effects its own permitted direction of resolution.

Before proceeding further with a detailed description of the compliance structure, a brief description will follow of two possible methods of measuring the orthogonal forces applied to the system, as will be generally described. As stated previously, the present compliance structure may serve two purposes, the first being a means for resolving and subsequently measuring the orthogonal forces applied to the structure which, as will be readily understood, provides a means for controlling the hydraulic mechanism. The second function is the ready adaptability of the presently disclosed compliance structure as a mechanical fuse or link which can be easily designed to take loads up to a certain point but which will then act as a mechanical fuse and break when a specified load is exceeded.

One method of measuring the forces is illustrated by the three strain gauges, A, B and C, mounted on the central webs of each of the compliance structures, 16, 18 and 20, respectively. These are conventional foil strain gauges which would normally be mounted at the maximum point of deflection in each of the flexible web sections. The strain gauges could be electrically connected to form a bridge circuit. Deflection of the webs could cause a stress in the gauges which in turn, would be detected as an unbalance in the bridge circuits.

An alternative method of mechanically sensing the motion could comprise the fixed rod 24 rigidly attached to the gripper finger 12 which rod extends into a detection assembly located within the protective housing 26 on the manipulator arm. It will be readily appreciated that the displacement of the rod 24 projecting into the housing 26 will be of the same relative magnitude and direction as the remainder of the gripper finger due to the application of a force thereto. The deflection in any of the three possible orthogonal directions will thus be fed to the detection unit 26. Any one of a variety of known methods for measuring displacement such as air gap, Hall effect, optical, etc. could be readily used. The particular manner in which orthogonal displacements are measured is not specifically relevant to the present invention and will not be described in further detail as it is considered to be state of the art.

Referring now to FIG. 1.2, the three-degree of freedom compliance structure 14 is shown, in exploded form. This figure serves also to illustrate at least two alternative methods for manufacturing and assembling the overall three-degree of freedom compliance structure. It will be noted in referring to the figure that all of the numerals are the same as those in FIG. 1.1. It will further be noted that element 16 as shown in FIG. 1.2 includes the basic flex web compliance element and a wedge shaped portion 17 forming an integral part thereof. It will also be noted that element 20 includes a wedge shaped portion 21 forming an integral part thereof. These two compliance elements are identical but are merely flipped over. Therefore, by utilizing two identical elements, 16 and 20, together with the basic element 18, the overall structure may be formed by attaching element 16 to element 18 via the planar regions 38 on the two elements which form bonding surfaces and by attaching element 20 to element 18 via the planar regions 36 which again, form bonding surfaces. Thus, in the embodiment, as shown in FIG. 1.2, two relatively simple structures would need to be manufactured to make the substantially more complex three degree of freedom overall structure. These are the two end elements, 16 and 20, including the wedge shaped portion 17 and 21 and the basic element 18.

As a further breakdown, the wedge shaped portions 17 and 21, which are identical, could be separately fabricated and all three of the individual compliance elements 16, 18 and 20 would be identical which might represent a still further saving of manufacturing cost. It is, however, to be noted that when a suitable plastic material such as polycarbonate is utilized to form the structure by appropriate injecting molding processes, making the complete three-degree of freedom compliance structure as a single unit, is believed to be the preferred method of manufacture.

Returning once again to FIG. 1.2 and specifically referring to the single element 18, for purposes of explanation, it will be noted that the two planar regions 36 and 38 at the opposite ends of the flexible web sections 22 are referred to herein as the mounting surfaces for convenience only. It should be clearly understood that when referring to the composite compliance structure, the term planar region, when used in the context of a single element, refers to the substantially planar portion of the overall compliance structure within each single compliance element to which the end of the webs are attached. These planar regions move relative to each other when a force is applied to a particular element normal to the plane of said webs. Thus, in the case of the composite structure as shown in FIG. 1.1, the interior planar regions of elements 16 and 20 in both surfaces of element 18 are, in effect, integral with the overall structure whereas the outer planar regions 30 and 32, as shown in FIG. 1.2, are actual attaching or mounting surfaces by which the overall compliance structure is attached to or incorporated in the overall robotic mechanism.

Figure 2:
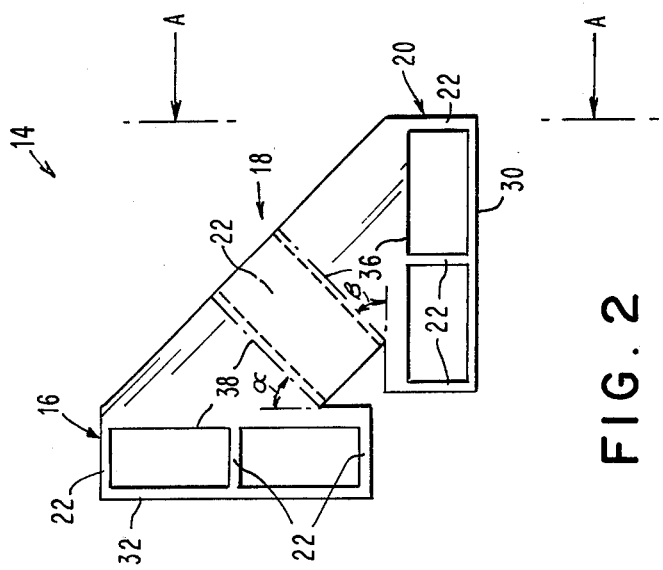
FIG. 2 comprises a side elevational view of the three-degree of freedom compliance structure of FIG. 1.

FIGS. 2 and 3 are a side view of the three-degree freedom compliance structure and a plan view along line A—A of FIG. 2 respectively. It will be noted that the same reference numerals are utilized in FIGS. 2 and 3 as in FIGS. 1.1 and 1.2 for the respective portions of the structure.

These figures are conventional in every respect and serve to show more clearly the symmetricity of the structure. FIG. 2 clearly illustrates that the overall structure could be mounted with either planar region 32 or 30, attached to the manipulator arm 10 and either surface attached to the gripper finger 12. This feature further simplifies orientation and attachment of the device to the robotic mechanism, it being noted that if the device were not symmetrical and it were inadvertently attached incorrectly, it could cause severe operating problems.

FIG. 2 also serves to illustrate clearly the relative placement of the three individual elements 16, 18 and 20, with respect to each other. It will be noted that relative to the two extreme (at opposite ends of the structure) elements 16 and 20 are so oriented that their respective planar regions or mounting surfaces 32 and 38, and 36 and 30 respectively, are perpendicular and the planes including the individual web elements 22 of each device are also perpendicular.

Conversely, the planar regions 36 and 38 of the element 18 are disposed at an acute angle respectively, to the planar regions 32, 38 and 30, 36 of elements 16 and 20. It should be noted that these two acute angles shown in FIG. 2 ($\alpha$ and $\beta$) are preferably equal i.e., 45 degrees. The two angles could be selected to be somewhat different, however, the structure would then lose its symmetricity as will be apparent.

The planes of the individual web elements 22 of the element 18 are also perpendicular to the planes of the webbed element 22 of both end elements 16 and 20.

Figure 4:
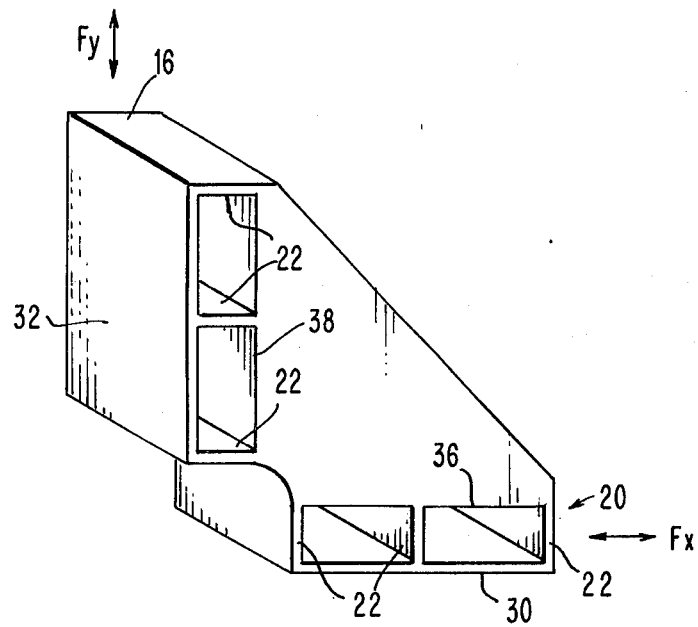
FIG. 4 is a perspective view of a symmetrical two-degree of freedom compliance structure, constructed in accordance with the teachings of the present invention.

Referring now briefly to FIG. 4, a perspective view is shown of a two-degree of freedom symmetrical compliance structure constructed in accordance with the teachings of the present invention. In this figure, the same reference numerals are utilized as in all of the other figures for convenience of reference. It is further noted that all of the numbered elements perform in exactly the same manner as in the embodiment of FIG. 1.1. The only difference is the elimination of the function of the element 18 which would resolve the third orthogonal component of force ($F_Z$). As with the embodiment of FIG. 1.1 the preferred method of making the device of FIG. 4 would similarly be by injection molding of the materials from such materials as polycarbonate, nylon, etc.

Figure 5:
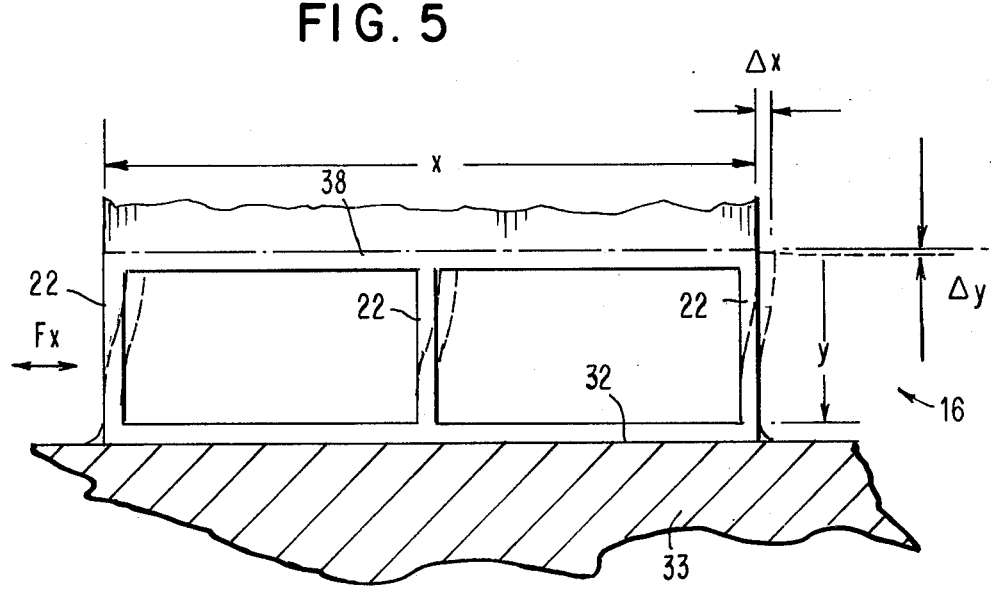
FIG. 5 is a side view of a single compliance element of one of the overall compliance structures, illustrating the action of the element when a force is applied.

Referring now to FIG. 5, there is shown an enlarged diagram of a single compliance element which is included for the purpose of showing, in exagerated form, the operation of the compliance element under the application of a transverse force F. The structure at rest is noted in solid lines whereas the structure, in its deformed condition, which it would assume under the application of the force F is shown in dotted lines. As with the other figures, the same numerals are utilized to refer to the same respective portions of the element. The planar region 32 is securely attached to the surface of body 33 by gluing, or the like, and hence, cannot flex.

Similarly, the surface 38 is a portion of the overall structure and cannot flex. The element 16 operates and performs like a parallelogram. That is, as a force F is applied, the two planar regions 32 and 38, remain substantially parallel but move with respect to each other an amount shown in the FIG. as $\Delta X$. The two planar regions 32 and 28 will move closer together by an amount shown in the FIG. as $\Delta Y$. However, this movement would be much less than the movement $\Delta X$ as will be appreciated from the geometry of the figure and hence this movement is not illustrated.

In a working model of the present invention, a compliance device was made of Lexan, which is a registered trademark of the General Electric Company, which name is specific to their polycarbonate material. A deflection ($\Delta X$) of approximately 5 mils occured under a transverse force of 5 lbs. In this working model the dimension X was 0.875 inches and the dimension Y was 0.203 inches. The thickness of the individual webs was 0.024 inches and the depth of the overall device was approximately 0.500 inches.

As stated previously, the preferred form of the invention comprises fabricating the three degree of freedom symmetrical compliance structure from a single block of plastic material such as polycarbonate by, for example, an injection molding process.

As will be apparent, the overall structure could alternatively be machined from a composite block of either polycarbonate or some sort of metal or even be fabricated by a plurality of process steps. In such cases, the individual flex webs might be separately manufactured and mounted in grooves machined in supporting structures as will be apparent. However, the overall geometry and symmetry of the device, as disclosed, would have to be maintained to achieve the herein described results.

INDUSTRIAL APPLICABILITY

As stated at length previously, the present compliance structure is primarily adapted for use in robotic manipulators wherein the structure serves not only as a means for measuring the three orthogonal forces which can be applied to such a structure but also can serve as, in effect, a mechanical fuse which will preferentially break before damage to the underlying robotic structure or workpiece can occur.

The primary advantages of the structure are that it is extremely compact and inexpensive to manufacture, especially when made as a unitary (single process) molded structure. Even in composite form the device is essentially modular and may be easily assembled from basic components.

Due to its low cost, it is readily expendable and may be easily replaced with a minimum of time and difficulty. Due to its inherent geometrical symmetricity it is virtually impossible to mount it incorrectly. Further, when manufactured of a suitable plastic material, such as polycarbonate, the structure is both an insulator and non-magnetic.

Having thus described my invention, what I claim as new, and desire to secure by Letters Patent is:

1. A symmetrical multiple degree of freedom compliant structure, comprising at least two individual compliant elements located at either end of said structure at substantial right angles to each other, said two compliant elements forming a unitary structure such that when a given force is applied the structure will orthogonally resolve the force along two orthogonal coordinates in response thereto, each of said compliant elements comprising two closely spaced planar regions, joined by at least two thin flexible webs which are parallel to each other and substantially perpendicular to the said planar regions with said at least two elements being disposed so that the planes including the planar regions, for each element are perpendicular to each other and the planes including the flexible webs of each element are perpendicular, and wherein each compliant element is constrained to flexural movement along a single axis perpendicular to said flexible webs.

2. A compliant structure set forth in claim 1, including a third compliant element, substantially identical to said other two compliant elements located intermediate of said two other compliant elements and so oriented that the planes of the planar regions of said intermediate element form an acute angle with respect to the planes including the planar regions of said other two elements and wherein the planes, including the flexible webs of said intermediate element are perpendicular to the planes including the flexible webs of both of said other two elements.

3. A compliant structure as set forth in claim 2 wherein the acute angle formed by the orientation of the intermediate element planar regions with those of the planar regions of said other two elements is approximately 45 degrees.

4. A compliant structure as set forth in claim 3 wherein said structure is constructed of a single body of a plastic material formed by molding.

5. A symmetrical three-degree of freedom compliant structure having two attachment surfaces for interposing said structure between two perpendicularly disposed members which are to be mechanically interconnected, wherein said two attachment surfaces are substantially perpendicular to each other, said compliant structure comprising three substantially identical compliant elements, two of said elements being located in the structure at opposite ends thereof, substantially parallel to said attachment surfaces and the third said element being located intermediately of said other two within said structure at an angle of substantially 45 degrees to each attachment surface, the direction of compliance of each of said elements being so oriented with respect to each other that they will resolve any force applied to one end of said structure with respect to the other along the three orthogonally disposed axes, as defined by said three elements and wherein the compliance element closest to each attachment surface is compliant in a direction parallel to a force vector parallel to said attachment surface.

6. A compliant structure as set forth in claim 5 above, wherein each of the said compliant elements comprises two closely spaced parallel planar regions interconnected by at least two widely spaced parallel flexible webs.

7. A compliant structure as set forth in claim 6, wherein each of said compliant elements includes at least three such flexible webs interconnecting their respective planar regions and evenly spaced within said structure whereby as a transverse force is applied to said element parallel to said planar regions causing said webs to flex, the planar regions remain substantially parallel.

8. A compliant structure as set forth in claim 7, wherein said three compliant elements are so oriented with respect to each other within said compliant structure that the planar regions of the two elements located at the ends of the structure are substantially perpendicular to each other and the planes, including the flexible webs of said two elements, are also substantially perpendicular to each other, and wherein the planar regions of said intermediate element are disposed at an angle of substantially 45 degrees with respect to the planar regions of both said other elements and wherein the planes, including the flexible webs of said intermediate element intersect the planes including the flexible webs of said other two elements at approximately right angles.

9. A symetrical three-degree of freedom compliant structure comprising three substantially identical compliant elements forming a unitary structure such that when a given force is applied the structure will orthogonally resolve the force along the three orthogonal coordinates in response thereto, each of said compliant members including regions in their structure which include two substantially planar regions disposed in closely spaced parallel relationship to each other and joined by at least two spaced parallel flexible webs which are perpendicular to the planar regions, wherein each element will flex when a force is applied to one said planar region with respect to the other parallel to the planar regions and perpendicular to the webs, two of said elements being disposed in said structure, at right angles such that the planes, including said webbed elements, intersect at right angles and the planes of the planar regions of said two elements intersect at right angles, the third element being disposed intermediately of said two other elements wherein the planar regions of said intermediate element intersect at approximately 45 degrees with the planar regions of each of said other two elements and wherein the planes, including the webbed elements of said intermediate element are perpendicular to the planes including the webbed elements of both of said two other members.

10. A compliant structure as set forth in claim 9, wherein each element has at least 3 evenly spaced flexible webs joining its two planar regions.

* * * * *

UNITED STATES PATENT AND TRADEMARK OFFICE
CERTIFICATE OF CORRECTION

PATENT NO. : 4,447,048
DATED : May 8, 1984
INVENTOR(S) : F. L. Fischer

It is certified that error appears in the above-identified patent and that said Letters Patent is hereby corrected as shown below:

| | |
|---|---|
| On the Cover Page | in the title delete "COMPLIANCE" and insert --COMPLIANT--; |
| Column 1 | in the title delete "COMPLIANCE" and insert --COMPLIANT--; |
| Column 7, line 39 | delete "compliance" and insert --compliant--. |

Signed and Sealed this

Seventeenth Day of December 1985

[SEAL]

Attest:

DONALD J. QUIGG

Attesting Officer    Commissioner of Patents and Trademarks